July 25, 1950 J. SINKO 2,516,532
STEERING WHEEL TURNING DEVICE
Filed Oct. 14, 1949
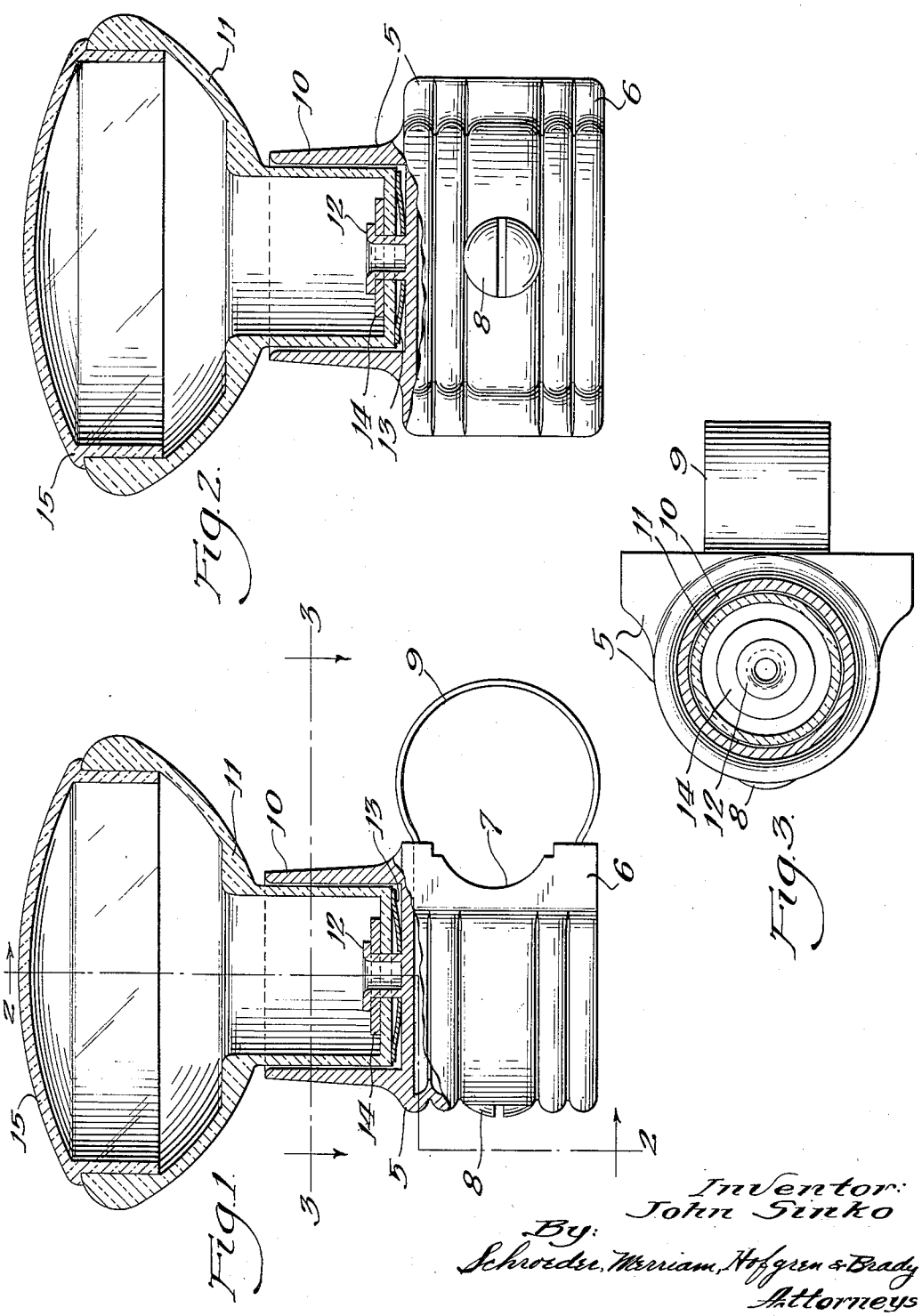
Inventor:
John Sinko
By:
Schroeder, Merriam, Hofgren & Brady
Attorneys

UNITED STATES PATENT OFFICE 2,516,532

STEERING WHEEL TURNING DEVICE

John Sinko, Chicago, Ill.

Application October 14, 1949, Serial No. 121,370

5 Claims. (Cl. 74—557)

This invention relates to a steering wheel turning device, and more particularly to an improved mounting for securing the handle or knob to the body member which is attached to the rim of a steering wheel.

The primary object of the invention is to provide an improved pivotal connection between the knob and the base of the device.

A further object of the invention is to provide an improved hollow knob of transparent material which may readily be secured to the base member, so that a certain amount of friction is provided to prevent rattling, and a transparent cap is provided to permit a picture or other device to be placed in the knob.

The invention is illustrated in a preferred embodiment in the accompanying drawings, in which:

Figure 1 is an elevational view partly in section showing the base and clamping band for securing the device to the rim of a steering wheel; Fig. 2, a similar view, partly in section, taken as indicated at line 2—2 of Fig. 1; and Fig. 3, a plan sectional view, taken as indicated at line 3—3 of Fig. 1.

In the embodiment illustrated, a metal body member 5 has a hollow base portion 6 which may be closed at the bottom. The base is substantially the same as the one shown in my patent application Serial No. 77,524, filed February 21, 1949. It has a lateral opening on one side, as indicated at 7, and an opening on the other side to receive a clamping screw 8.

A flexible metal band 9 has its end portions turned inwardly and provided with a nut so that, after the band has been placed around the rim of a steering wheel, its ends may be inserted into the base and drawn inwardly by turning the screw 8. An upwardly extending bearing portion 10 is cup-shaped to receive the shank of a plastic knob 11. As shown, a fastening member 12 may be in the form of a hollow rivet integrally formed with the base member and extending upwardly to impale the cup-shaped shank portion of the knob 11. Preferably, a dish-shaped spring metal washer 13 is provided between the knob and the base, and a washer 14 is provided inside the knob and is slipped over the stud 12 before its top portion is crimped outwardly to make the final pivotal connection.

The knob is of molded plastic and has a removable transparent cap 15, which is yieldingly held to the remainder of the knob by friction. Of course, the cap must be removed during the assembly operation, to enable the stud to be expanded over the washer 14. The cap preferably has an upwardly convex surface, so that if a picture is placed within the cap its appearance is magnified. The knob and cap may be made of various colors, and contrasting colors may be used, if preferred. Preferably, however, the lower part of the knob is colored and the cap made of transparent plastic.

In the drawings, the stud 12 is shown inegrally formed with the metal base. However, it will be readily understood that a separate bolt or rivet may be used, if preferred.

The foregoing detailed description is given for clearness of understanding only, and no unnecessary limitations should be understood therefrom, for some modifications will be obvius to those skilled in the art.

I claim:

1. A steering wheel turning device comprising: a hollow metal body member having a base portion adapted to be clamped to the rim of a steering wheel and an upwardly extending bearing portion, said base portion being provided with a centrally disposed fastening member extending upwardly into said bearing portion; a hollow knob having a cup-shaped shank portion journalled in the bearing portion of the base and impaled by said fastening member; and a spring on the fastening member to resist yieldingly rotation of said knob with respect of said body member.

2. A device as specified in claim 1, in which the fastening member is a metal stud integral with the body member.

3. A device as specified in claim 1, in which the fastening member is a metal stud integral with the body member, and the spring is a bowed resilient disc impaled by said stud.

4. A device as specified in claim 1, in which the fastening member is a metal stud integral with the body member, the spring is a bowed resilient disc impaled by said stud and positioned between the lower end of the knob and the base, a metal washer is impaled by the stud within said knob, and the end of the stud is expanded over said washer.

5. A device as specified in claim 1, in which the hollow knob is made of plastic material and has a transparent removable cap.

JOHN SINKO.

No references cited.